United States Patent [19]

Nesheiwat et al.

[11] Patent Number: 5,171,831
[45] Date of Patent: Dec. 15, 1992

[54] PRODUCING HIGH MOLECULAR WEIGHT POLY(ARYLENE SULFIDE) POLYMERS BY ADDING SECOND POLAR SOLVENT PRIOR TO TERMINATION OF POLYMERIZATION

[75] Inventors: Afif M. Nesheiwat, Madison, N.J.; Kenneth C. Hoover, Tulsa, Okla.

[73] Assignee: Phillips Petroleum Company, Bartlesville, Okla.

[21] Appl. No.: 621,413

[22] Filed: Dec. 3, 1990

[51] Int. Cl.$^5$ ............................................. C08G 75/16
[52] U.S. Cl. ..................................... 528/388; 528/387
[58] Field of Search ................................. 528/388, 387

[56] References Cited

U.S. PATENT DOCUMENTS

| | | | |
|---|---|---|---|
| 3,354,129 | 11/1967 | Edmonds, Jr. et al. | 260/79 |
| 3,800,845 | 4/1974 | Scoggin | 159/47 |
| 3,919,177 | 11/1975 | Campbell | 260/79.1 |
| 4,415,729 | 11/1983 | Scoggins et al. | 528/388 |
| 4,524,200 | 6/1985 | Sherk et al. | 528/388 |
| 4,645,826 | 2/1987 | Iizuka et al. | 528/388 |
| 4,730,034 | 3/1988 | Nesheiwat et al. | 528/388 |
| 4,801,664 | 1/1989 | Nesheiwat et al. | 525/537 |
| 4,820,800 | 4/1989 | Geibel et al. | 528/388 |
| 4,822,416 | 11/1989 | Senatore et al. | 528/388 |
| 5,032,672 | 7/1991 | Kato et al. | 528/388 |

FOREIGN PATENT DOCUMENTS 0347073 12/1989 European Pat. Off. .

Primary Examiner—Harold D. Anderson
Attorney, Agent, or Firm—Beverly M. Dollar

[57] ABSTRACT

A process for producing an easily recoverable poly(arylene sulfide) polymer having a melt flow of less than 130 g/10 min., which processes comprises:
a) adding a second polar organic compound to a polymerization reaction mixture during polymerization immediately prior to termination of said polymerization, wherein said polymerization reaction mixture is formed by reacting reactants comprising a dihaloaromatic compound, a sulfur source and a first polar organic compound under suitable polymerization conditions, and wherein the molar ratio of second polar organic compound added to first polar organic compound is in the range of 0.05 to 2; and thereafter
b) terminating said polymerization; and
c) recovering said polymer.

7 Claims, No Drawings

PRODUCING HIGH MOLECULAR WEIGHT POLY(ARYLENE SULFIDE) POLYMERS BY ADDING SECOND POLAR SOLVENT PRIOR TO TERMINATION OF POLYMERIZATION

BACKGROUND OF THE INVENTION

This invention relates to poly(arylene sulfide) polymers. In one aspect, this invention relates to the production of relatively high molecular weight poly(arylene sulfide) polymers. In another aspect, this invention relates to the preparation of poly(arylene sulfide) polymers in an easily recoverable granular form.

Poly(arylene sulfide) polymers are known in the art and have found wide use due to their desirable thermal and chemical resistance. Poly(arylene sulfide) polymers are useful in the formation of films, fibers, composites and molded parts by variety of methods known to those of skill in the art.

For many of the above-mentioned applications, it is desirable that the poly(arylene sulfide) be of relatively high molecular weight. One problem that has been experienced in the recovery of such high molecular weight poly(arylene sulfide) polymer is the polymer's tendency to agglomerate into large chunks during solid particle formation which makes recovery of the polymer more difficult. It would therefor be desirable to have a method of producing a relatively high molecular weight poly(arylene sulfide) polymer in an easily recoverable granular form.

SUMMARY OF THE INVENTION

It is an object of the present invention to provide a process for producing a relatively high molecular weight poly(arylene sulfide) polymer in an easily recoverable granular form. It is another object of the present invention to provide a process for increasing the molecular weight of a poly(arylene sulfide) polymer.

In accordance with this invention, a polar organic compound is added to a poly(arylene sulfide) polymerization reaction mixture immediately prior to termination of the polymerization. The addition of the polar organic compound results in an increase in the molecular weight of the poly(arylene sulfide) and/or the formation of the polymer in easily recoverable granular form.

DESCRIPTION OF THE PREFERRED EMBODIMENTS

The poly(arylene sulfide) polymer employed in this invention can be prepared by any method known to those of ordinary skill in the art. Generally, the polymer is prepared by reacting a dihaloaromatic compound and a sulfur source in the presence of a polar organic compound under conditions sufficient to achieve polymerization. One method of producing such poly(arylene sulfide) polymers is disclosed in U.S. Pat. No. 3,354,129. The method of this patent employs the use of polyhalo substituted aromatic compounds in order to produce branched high molecular weight poly(arylene sulfide) polymers. Another method for the production of a poly(arylene sulfide) polymer is that disclosed in U.S. Pat. No. 3,919,177, which employs alkali metal carboxylates in order to produce an essentially linear, high molecular weight poly(arylene sulfide) polymer. In this invention, either branched or essentially linear poly(arylene sulfide) polymers may be employed.

The term "relatively high molecular weight poly(arylene sulfide) polymer" is meant to denote polymers exhibiting a melt flow rate of less than 130 grams per 10 minutes, when measured in accordance with ASTM 1238D, condition (315/5.0), modified to use a 5 minute preheat time.

The poly(arylene sulfide) polymerization reaction mixture is formed by adding reactants comprising a dihaloaromatic compound, a sulfur source, a polar organic compound, and a polyhalo substituted aromatic compound or an alkali metal carboxylate. Optionally, the reaction mixture can contain other components such as an alkali metal base. It is noted that water can be present in any of the individual reactants and will be generated during the polymerization reaction. If desired, dehydration steps can be employed prior to polymerization in order to remove all but about 1 mole of water per mole of dihaloaromatic compound.

The dihaloaromatic compounds which can be employed in this invention are those described in U.S. Pat. Nos. 3,354,129 and 3,919,177, the disclosures of which are hereby incorporated by reference. It is preferred to employ p-dihalobenzenes represented by the formula

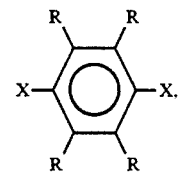

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecular being within the range of 6 to about 24, with the proviso that in at least 50 mole percent of the p-dihalobenzene employed each R must be hydrogen. P-dichlorobenzene (DCB) is the presently preferred dihaloaromatic compound.

Suitable sulfur sources are also disclosed in the two above-cited patents. It is preferred to use alkali metal sulfides or alkali metal bisulfides. It is presently preferred to use sodium hydrosulfide as the sulfur source.

The polar organic compounds useful in this invention are solvents for both the halogenated aromatic compounds and the sulfur source. The polar organic compound used should be substantially liquid at the reaction temperatures and pressures employed. It is preferred to use an organic amide as the polar organic compound. Suitable examples include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like, and mixtures thereof. It is presently preferred to employ N-methyl-2-pyrrolidone (NMP) as the polar organic compound.

The polar organic compound added immediately prior to the termination of the polymerization can be the same compound employed as the reactant in the polymerization mixture or it can be a different compound. It is presently preferred to employ the same compound for use as a reactant and as the additive near the end of the polymerization due to convenience.

Polyhalo-substituted aromatic compounds having more than two halogen substitutions can be employed as reactants in order to prepare branched, relatively high molecular weight poly(arylene sulfide) polymers. Suitable polyhalo-substituted compounds which can be employed are disclosed in U.S. Pat. No. 3,354,129. It is presently preferred to use 1,2,4-trichlorobenzene (TCB) as the polyhalo-substituted compound when preparing branched, relatively high molecular weight poly(arylene sulfide) polymers.

Alkali metal carboxylates can be employed as reactants in the polymerization reaction mixture in order to prepare essentially linear, relatively high molecular weight poly(arylene sulfide) polymers. Suitable examples of alkali metal carboxylates are disclosed in U.S. Pat. No. 3,919,177. It is presently preferred to employ sodium acetate as the alkali metal carboxylate, due to its availability and the good results obtained with its use.

A base can optionally be employed as a reactant. It is preferable to use a base when the sulfur source employed is an alkali metal bisulfide. If a base is employed, alkali metal hydroxides or alkali metal carbonates are typically employed. When employed, it is presently preferred to use sodium hydroxide as the base.

Although the ratio of reactants can vary considerably, the molar ratio of dihaloaromatic compound to sulfur source should be within the range of about 0.8 to about 2, preferably from 0.95 to about 1.3. The molar ratio of polar organic compound added with the reactants to sulfur source should be within the range of about 2 to about 8. The amount of polyhalo-substituted aromatic compound employed as a reactant is that amount necessary to achieve the desired degree of branching, causing the polymer to exhibit the required melt flow. Generally, about 0.001 to 0.02 moles of polyhalo-substituted aromatic compound per mole of dihaloaromatic compound are employed. When an alkali metal carboxylate is employed, the mole ratio of alkali metal carboxylate to dihaloaromatic compounds should be within the range of about 0.05 to about 4, preferably from about 0.1 to about 2.

The reactants can be introduced into contact in any order. As previously mentioned, water can be removed prior to polymerization. The polyhalo-substituted aromatic compound can be added at any time during the polymerization in order to affect the type of branching that occurs.

The temperature at which the polymerization is conducted is generally within the range of about 235° to about 450° C., preferably from about 240° to about 350° C. The pressure need be only sufficient to maintain the dihaloaromatic compound and polar organic compound substantially in the liquid phase and to retain the sulfur source therein. The reaction time is within a range of about 10 minutes to 3 days, preferably from 1 hour to 8 hours.

According to this invention, an amount of polar organic compound is added to the polymerization reaction mixture immediately prior to termination of the polymerization reaction. In other words, an amount of polar organic compound is added to the polymerization reaction mixture while maintaining polymerization conditions and thereafter the polymerization is terminated. The term "termination of the polymerization" is not meant to imply that complete reaction of the reactants (or 100% conversion) has taken place. Termination of the polymerization reaction can take place, for example, by removing the heating means and allowing the temperature of the reaction mixture to fall below that at which substantial polymerization takes place. Generally, this temperature will be below 235° C.

By the term "immediately prior", it is meant that no significant amount of time lapses between addition of the polar organic compound and termination of polymerization. It is recognized that addition of the polar organic compound may take some of time and actual temperature of polymerization conditions can take some amount of time due to the time necessary for cooling the reaction mixture. Although those of ordinary skill in the art can determine the time involved without undue experimentation, it is invisioned that commencement of termination of the polymerization conditions would occur within ½ hour of the completion of the addition of polar organic compound to the reaction mixture.

The amount of polar organic compound added immediately prior to termination of the polymerization is that amount suitable to increase the molecular weight of the polymer and/or produce poly(arylene sulfide) polymer in easily recoverable granular form. Generally, the molar ratio of polar organic compound added near the end of the polymerization to that amount added with the reactants is in the range of 0.05 to 2, preferably 0.1 to 1. The polar organic compound added near the end of the polymerization is preferably heated to reactor conditions and charged slowly to the reactor in order to maintain polymerization conditions during the addition.

The poly(arylene sulfide) polymers produced by the process of this invention can be separated from the reaction mixture by conventional procedures, for example, by filtration of the polymer, followed by washing with water, or by dilution of the reaction mixture with water, followed by filtration and water washing the polymer. The polymers can be recovered by a "flash" process such as that disclosed in U.S. Pat. No. 3,800,845, or by employing a separation agent as described in U.S. Pat. No. 4,415,729.

The thus-recovered polymer can be acid-treated as described in U.S. Pat. No. 4,801,664. The polymer can be compounded with various reinforcing fibers, fillers, pigments, stabilizers, processing aids, nucleating agents and any other additives commonly used in poly(arylene sulfide) compositions.

The following examples are provided in order to illustrate the present invention, and are not meant to limit the scope thereof.

In the following examples, the polymer melt flow rate (FR) was determined by the method of ASTM D-1238, Condition 316/5.0, modified to use a 5 minute preheat, the value of FR being expressed as g/10 minutes. Polymer screening analyses were done with a set of U.S. Standard sieves with values of mesh/opening ($\mu$m) of 10/2000; 20/841; 35/500; 60/250; 100/149; 200/74.

A polyphenylene sulfide (PPS) sample was prepared for use in Examples 1 and 2 in a process such as that disclosed in U.S. Pat. No. 3,354,129, by mixing aqueous sodium hydroxide (NaOH), aqueous sodium hydrosulfide (NaSH), N-methyl pyrrolidone (NMP), and sodium acetate, dehydrating the mixture, and polymerizing this dehydrated mixture with p-dichlorobenzene (DCB) and 1,2,4-trichlorobenzene (TCB). The amount of TCB was 0.3 mole percent of the DCB charge. The product of the polymerization was flashed to remove solvent and washed with water to remove the salt by-product. The final, dried product had a FR of 10.8 g/10 min.

EXAMPLE 1

This example is a control run that demonstrates the coarser particle size produced with a low flow rate PPS in the absence of the added diluent of the present invention. In order to have a consistent starting polymer solution for particle formation, the PPS described above was used to prepare standard starting polymer solutions for this example and Example 2.

A 324 g portion of the PPS was mixed with 55 g water, 82 g sodium acetate, and 1000 g NMP in a reactor and heated to simulate the PPS polymerization mixture at the termination of a polymerization. The reactor stirrer was stirred and the reactor was purged with nitrogen, heated to 260° C., and held for 30 minutes. After the heat to the reactor had been terminated, the reactor was cooled slowly to 200° C. Approximately 500 mL of water was added to the reactor and the reactor was then cooled rapidly. The reactor contained a coarse, light tan product which was recovered on a 100 mesh screen.

This product Run 1 was recovered in 98 weight percent yield and had a FR of 5 g/10 min. A screening analysis of the product showed that it retained about 35.7 weight percent on a 10 mesh screen.

EXAMPLE 2

Two runs were carried out according to the process of the present invention with NMP added to the hot PPS mixture. A mixture like that described in Example 1 was heated to 260° C. in a reactor. At the conclusion of the 30 minute heating time, 300 mL of NMP was added slowly to the reactor to keep the temperature above 240° C. and the polymer was recovered as described in Example 1. The product of Run 2 had only 0.9 weight percent material on the 10 mesh screen.

In Run 3, 150 mL of NMP was added to the hot mixture and the recovered polymer contained 11.0 weight percent material on a 10 mesh screen. Both products from Runs 2 and 3 were a light tan color. The entire screening results from Runs 2 and 3 are summarized in Table 1. Run 1 from Example 1 is included for comparison. The particle sizes in Runs 2 and 3 were clearly smaller than in control Run 1.

of NMP were added to a stirred (400 rpm) reactor, which was then purged with nitrogen. This mixture was heated to about 152° C. and dehydrated to remove water while the temperature increased to about 210° C.

Then 62.4 kg of DCB and 105 mL of TCB in 7.6 L of NMP were charged to the reactor. The mixture was heated to about 232° C. and held for two hours. Next the reactor temperature was increased to about 265° C. and held for about three hours. At this point 26.9 L of NMP was heated by passing through a heat exchanger at it was charged slowly to the reactor over a 10 minute period. The reaction mixture was then cooled to about 135° C. and 37.85 L of deionized water was added. Next, the mixture was diluted with 227 L of deionized water in another tank.

The polymer slurry was filtered and the polymer solid was washed once with cold city water and twice with hot deionized water. The dried PPS product had a flow rate of 11 g/10 min.

Runs 5 and 6 were carried out by a procedure similar to that described for Run 4, except that no TCB was used. The products had flow rates of 84 and 130 g/10 min. respectively. Run 6 is outside the range of suitable flow rates for the practice of this invention since the particle sizes at this flow rate are fine enough without NMP addition that size reduction is not necessary.

Control Runs 7, 8, and 9 were carried out in a manner similar to the corresponding Runs 4, 5 and 6 except that no NMP was added to the hot polymerization mixture at the conclusion of the 265° C. hold.

The polymers from this example are described in Table II. As the melt flow decreases in control Runs 9, 8, and 7, the largest particle size fraction increases. A comparison of the particle sizes of invention Run 4 with control Run 7 shows that the NMP addition to the reaction mixture reduces the amount of the 10 mesh fraction significantly. Likewise, the particle sizes of the PPS product of Run 5 are smaller than in the corresponding Run 8.

TABLE I

| Run | NMP Added ml | Particles | Melt Flow g/10 min | Recovered Wt. % | PPS Particle Size Amount on Screens[a], wt. % | | | | | |
|---|---|---|---|---|---|---|---|---|---|---|
| | | | | | 10 | 20 | 35 | 60 | 100 | 200 |
| 1 | 0 | Coarse | 5 | 98 | 35.7 | 45.8 | 11.7 | 5.8 | 0.9 | 0.1 |
| 2 | 300 | Granular | 2.5 | 95 | 0.9 | 22.8 | 28.0 | 35.6 | 11.0 | 1.6 |
| 3 | 150 | Granular | ND[b] | 96 | 11.0 | 45.6 | 21.7 | 17.7 | 3.6 | 0.3 |

[a]Amount collected on screens of indicated mesh sizes.
[b]ND = not determined.

EXAMPLE 3

A series of PPS polymerization runs was carried out to prepare different flow rate PPS samples to demonstrate the effect of flow rate and the process of the present invention on PPS particle size.

In polymerization Run 4, a mixture of 32.52 kg of a 49.91 weight percent NaOH solution with 39.89 kg of a solution containing 59.05 weight percent NaSH and 0.368 weight percent sodium sulfide was prepared. This solution, 10.4 kg of sodium acetate powder, and 129.4 L

TABLE II

| Run | TCB ml | NMP Added Liters | PPS Particle Size Flow Rate g/10 min | Amount on Screens,[a] wt %. | | | | |
|---|---|---|---|---|---|---|---|---|
| | | | | 10 | 20 | 35 | 60 | 100 |
| 4 | 105 | 26.9 | 11 | 53.4 | 44.0 | 2.3 | 0.1 | 0.1 |
| 5 | 0 | 26.9 | 84 | 40.2 | 53.0 | 5.3 | 1.3 | 0.1 |
| 6 | 0 | 68.5 | 130 | 1.0 | 71.7 | 20.0 | 6.7 | 0.4 |
| 7 | 105 | 0 | 10 | 92.6 | 6.8 | 0.0 | 0.0 | 0.1 |
| 8 | 0 | 0 | 83 | 62.3 | 37.4 | 0.0 | 0.1 | 0.1 |
| 9 | 0 | 0 | 123 | 37.1 | 57.7 | 4.5 | 0.5 | 0.1 |

[a]Amount collected on screens of indicated mesh sizes.

EXAMPLE 4

In this example, the disadvantage of adding the NMP too rapidly and without heating to the hot polymerization mixture is demonstrated. Run 10 was carried out in a manner similar to that described for Run 4, except that the NMP was added to the hot polymerization mixture without heating over a time period of about 4 minutes. The polymerization product could not be removed from the reactor.

EXAMPLE 5

This example demonstrates the process of the present invention for the preparation of a PPS copolymer. A polymerization Run 11 was carried out in a manner similar to that described in Example 2, except that 59.78 kg of DCB, 7.9 kg of 4,4′-dibromobiphenyl, and 210 mL of TCB were used. The resulting polymer had a melt flow of 28 g/10 min. A sieve analysis showed that the fractions contained (mesh/wt %) 10/26.67; 20/63.22; 35/9.29; 60/0.68; 100/0.1; 200/0.05. The NMP addition of the present invention produces a good PPS copolymer containing biphenyl segments without large quantities of large particles.

While this invention has been described in detail for the purpose of illustration, it is not meant to be limited thereby, but is intended to cover all reasonable modifications thereof.

That which is claimed is:

1. A process for producing an easily recoverable poly(arylene sulfide) polymer having a melt flow of less than 130 g/10 min., which processes comprises:
    a. adding a second polar organic compound to a polymerization reaction mixture during polymerization immediately prior to termination of said polymerization, wherein said polymerization reaction mixture is formed by reacting reactants comprising a dihaloaromatic compound, a sulfur source and a first polar organic compound under suitable polymerization conditions, and wherein the molar ratio of second polar organic compound added to first polar organic compound is in the range of 0.05 to 2; and thereafter
    b. terminating said polymerization; and
    c. recovering said polymer.

2. A process according to claim 1 wherein said polymerization reaction mixture further comprises a polyhalo-substituted aromatic compound.

3. A process according to claim 1 wherein said polymerization reaction mixture further comprises a alkali metal carboxylate.

4. A process according to claim 1 wherein said first polar organic compound and said second polar organic compound are the same compound.

5. A process according to claim 4 wherein said first and second polar organic compounds are N-methyl-2-pyrrolidone.

6. A process according to claim 1 wherein said termination of polymerization is accomplished by reducing the temperature of said reaction mixture.

7. A process according to claim 6 wherein said polymerization reaction occurs at a temperature in the range of 235° C. to 450° C., and said termination is accomplished by reducing the reaction mixture temperature to a temperature below about 200° C.

* * * * *